(12) United States Patent
Voutour (10) Patent No.: US 8,167,199 B1
(45) Date of Patent: May 1, 2012

(54) SYSTEMS AND METHODS FOR DYNAMICALLY VALUATING A GIFT CARD

(75) Inventor: Teddy Joseph Edmund Voutour, Helotes, TX (US)

(73) Assignee: United States Automobile Association (USAA), San Antonio, TX (US)

(*) Notice: Subject to any disclaimer, the term of this patent is extended or adjusted under 35 U.S.C. 154(b) by 535 days.

(21) Appl. No.: 12/364,002

(22) Filed: Feb. 2, 2009

(51) Int. Cl.
*G06K 5/00* (2006.01)
(52) U.S. Cl. ........................................................ 235/380
(58) Field of Classification Search .................. 705/14, 705/39; 235/380
See application file for complete search history.

(56) References Cited

U.S. PATENT DOCUMENTS

| | | | |
|---|---|---|---|
| 7,010,512 B1* | 3/2006 | Gillin et al. ........................ 705/39 |
| 2006/0293953 A1* | 12/2006 | Nicholson ........................ 705/14 |
| 2007/0017975 A1* | 1/2007 | Lewis et al. ........................ 235/380 |
| 2008/0048023 A1 | 2/2008 | Russell et al. |
| 2008/0208747 A1 | 8/2008 | Papismedov et al. |
| 2008/0223922 A1 | 9/2008 | Weitzman |
| 2008/0235122 A1 | 9/2008 | Weitzman |

OTHER PUBLICATIONS

"PAYware GiftCard", VeriFone, The Way to Pay, www.verifone.com, 2 pages, 2003.
Nikhil bhatla: "Gift Cards, Post-Pay Style, The End of Trading Money for Nothing", http://nikhil.superfacts.org/archives/2007/07/gift_cards_post.html, Jul. 11, 2007, pp. 1-14.

* cited by examiner

*Primary Examiner* — Kristy A Haupt
(74) *Attorney, Agent, or Firm* — Brooks, Cemeron & Huebsch, PLLC

(57) ABSTRACT

A gift card that dynamically changes its value based on how it is used. For example, a gift card may have a different value in accordance with a merchant where the card is used, a merchant category, a product being purchased, a product manufacturer, etc. The gift card may operate within a traditional credit/debit card processing infrastructure, wherein the card processing infrastructure transmits the merchant details along with the authorization/approval request to a card processor and/or card issuer. The gift card may be authorized for a specific value for that merchant, the merchant category, product, etc. Thus, the gift card may have a value of $25 at a first store, but the same gift card may have a value of $50 at a second store in accordance with a predetermined value factors assigned to the stores.

20 Claims, 6 Drawing Sheets

| Card Number | Merchant ID | Vf Factor | Incentive |
|---|---|---|---|
| 3715380194716680 | 586 | 1 | 10% |
| 3715380194716680 | 458 | 1 | 10% |
| 3715380194716680 | 879 | 2 | 0% |
| 3715380194716680 | 256 | 2 | 0% |
| 3715380194716680 | Default | 1 | 0% |
| 2687742067312180 | 895 | 1 | 10% |
| 2687742067312180 | 365 | 2 | 0% |
| 2687742067312180 | 894 | 2 | 0% |
| 2687742067312180 | 987 | 10 | 0% |
| 2687742067312180 | Default | 1 | 0% |
| ... | ... | ... | ... |
| 5756137184767590 | 885 | 1 | 10% |
| 5756137184767590 | 894 | 2 | 0% |
| 5756137184767590 | Default | 2 | 0% |

SYSTEMS AND METHODS FOR DYNAMICALLY VALUATING A GIFT CARD

BACKGROUND

Traditional gift cards are a "one-size fits all" product. For example, some gift cards are tied to a particular store and have a single value. Thus, if a mom gives a $25 STARBUCKS gift card to her daughter, then her daughter must spend the $25 at STARBUCKS. However, if her daughter wanted to spend $25 at TARGET, she would not be able to use the STARBUCKS gift card there.

Some gift cards available from major credit/debit card issuers, e.g., VISA, MASTERCARD or AMERICAN EXPRESS, may be used anywhere VISA, MASTERCARD or AMERICAN EXPRESS are accepted. These gift cards, however, are also "one-size fits all" products, and because they may be used anywhere, the daughter may purchase products and or services that are objectionable to the mom. For example, if a mom gives the daughter a $25 VISA gift card, her daughter may spend $25 on any product or service the daughter wishes.

However, there is not a gift card that incentivizes the recipient to make acceptable choices. For example, mom may like for her daughter to buy a book or school supplies using the gift card, but her daughter may go to Whataburger with her friends to purchase burgers and fries. What is needed is a gift card that dynamically adjusts its value and that incentivizes the recipient to follow certain behaviors in order to obtain maximum value from the gift card.

SUMMARY

A gift card that dynamically changes its value based on how it is used. For example, a gift card may have a different value in accordance with a merchant where the card is used, a merchant category, a product being purchased, a product manufacturer, etc. The gift card may operate within a traditional credit/debit card processing infrastructure, wherein the card processing infrastructure transmits the merchant details along with the authorization/approval request to a card processor and/or card issuer. The gift card may be authorized for a specific value for that merchant, the merchant category, product, etc. Thus, the gift card may have a value of $25 at Starbucks, but it may have a value of $50 at Best Buy in accordance with a predetermined value factor.

In some implementations, the credit/debit card-processing infrastructure may be augmented or eliminated as the gift card may use Smart Card or near-field effect (NFE) technology.

In some implementations, the gift card value may increase value over time if unused. Thus, if the gift card has a value of $25 and is unused in the current month, it may be worth a greater amount in a next month.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred implementations, is better understood when read in conjunction with the appended drawings. For the purposes of illustration, the implementations shown in the drawings are exemplary implementations; however, the present disclosure is not limited to the specific methods and instrumentalities disclosed in the drawings.

DETAILED DESCRIPTION

Disclosed herein are implementations for providing a dynamic gift card that may change value based on how, when or where the gift card is used. In a transaction between a buyer using the dynamic gift card and a merchant, the merchant details may be communicated with the authorization/approval request, which may in turn authorize the gift card for a specific value for that merchant, merchant category, product or service, time of purchase, etc. For example, if the purchaser presents a gift card for a purchase at STARBUCKS, the card may have a value of $25. However, using the same gift card, if the purchaser presents the gift card for purchases at BEST BUY, it may have a value $50. The gift card processing may be implemented within a credit card processing infrastructure, or on the card itself using Smart Card or near-field effect (NFE) technology. In some implementations, the gift card may increase value over time if unused. Thus, if the recipient of the card delays making purchases, a $25 gift card this month, may be worth a greater amount next month.

Figure 1:
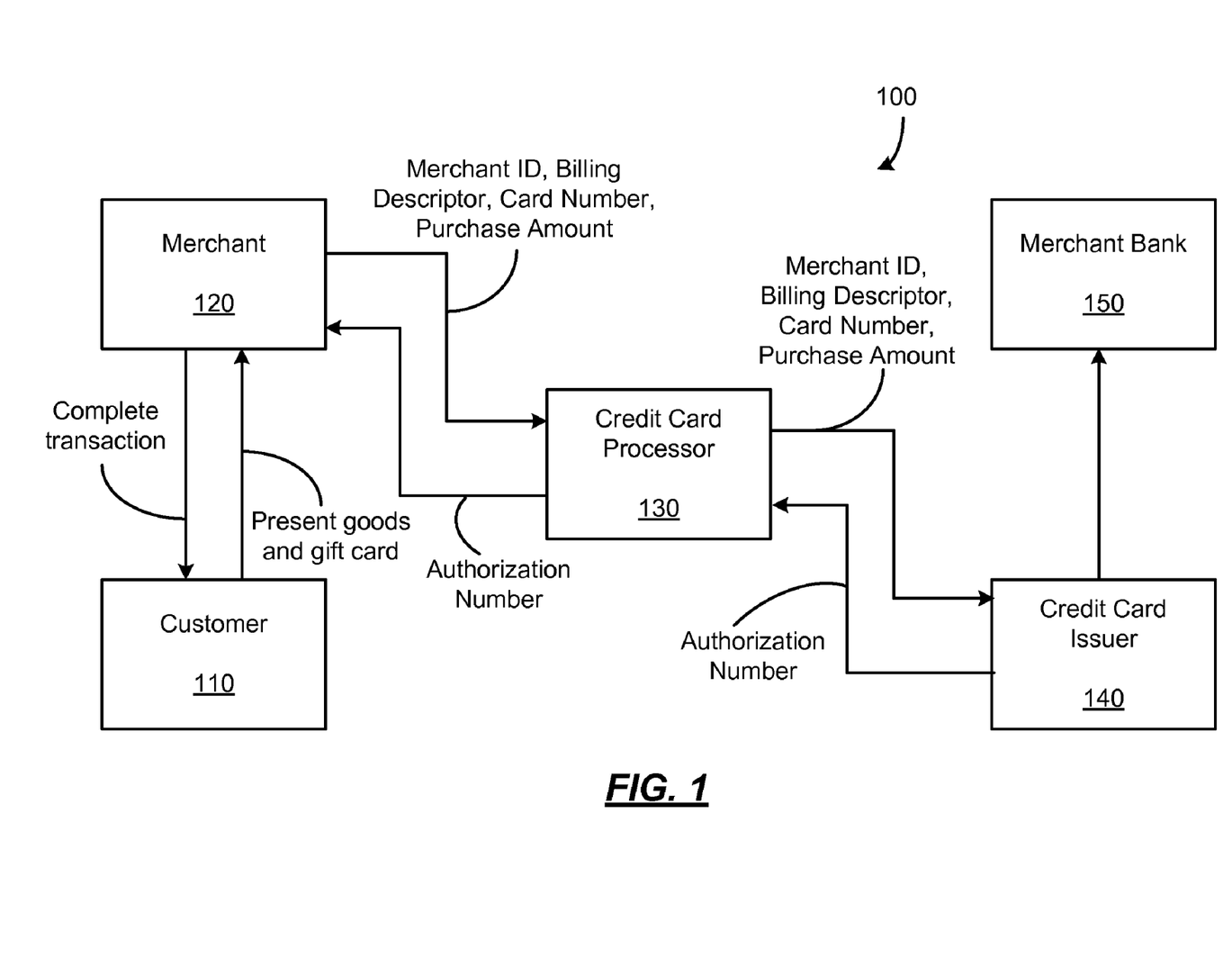
FIG. 1 illustrates an exemplary relationship between a card processor, a number of issuers, and a number of cardholder accounts.

FIG. 1 shows an illustrative network environment 100 for transferring transactional information between the parties that may participate in the purchase of goods or services, including a customer 110, a merchant 120, a credit card processor 103, and one or more banks or card issuers, such as a merchant bank 150 and/or a card issuer 140. The goods or services may be purchased in a traditional point-of-sale environment, e.g., from the merchant 120.

As shown in FIG. 1, a customer 110 may purchase a plurality of goods or services from a merchant 120 in a conventional manner using, e.g., a gift card. The gift card may be an AMERICAN EXPRESS, VISA, MASTERCARD branded gift card (or other major credit/debit card issuer's card), such that it may be accepted at locations that accept AMERICAN EXPRESS, VISA, MASTERCARD credit and/or debit cards. As part of the transaction between the customer 110 and the merchant 120, the customer 110 may provide to a point-of-sale location (e.g., a cashier, a checkout counter, etc.) products or services for purchase. At the point-of-sale, a merchant representative may scan a barcode, read an RFID, or key in information regarding the products or services for purchase. The customer 110 may then present the gift card as a vehicle to pay for the products or services. The merchant 120 may then process the gift card in a manner similar to a credit or debit card using a terminal apparatus. After the merchant 120 has received an approval for the gift card purchase from the card issuer 140, in the manner described below, the merchant 120 may complete the transaction with the customer 110.

With respect to processing of the gift card used for the purchased items or goods, the merchant 120 and the card issuer 140 operate in a manner that may include a third party credit card processor 130. In some implementations, the credit card processor 130 may be the same entity as the card issuer 140. In order to receive payment for the purchased goods or services, the merchant 120 transmits a communication to the card issuer 140, via the credit card processor 130, as shown in FIG. 1. The merchant 120, credit card processor 130 and card issuer 140 transmit digitally encoded data and other information between one another as part of the process. The communications link between the merchant 120, credit card processor 130 and card issuer 140 preferably comprises a network link on which electronic signals can propagate.

The transaction information that is transmitted by the merchant 120 to the card issuer 140 may include a merchant identification number, a billing descriptor, a gift card number, and the purchase amount. As discussed further below, the billing descriptor may include an indication of the reference number associated with the customer's order, the name of the merchant 120, and a detailed product descriptor identifying the individual item or service. The gift card number may identify the type of card that can be used by the credit card processor 130 to identify the appropriate card issuer 140 to contact for authorization.

Upon receipt of the transaction information, the card issuer 140 may evaluate the gift card number to determine whether the received number is a valid number, and thereafter determine whether the purchase price is within the pre-established value of the gift card. If the purchase price is within the pre-established value, the card issuer 140 then deducts the amount from the remaining value of the gift card, and transmits an authorization number to the merchant 120, via the credit card processor 130. The card issuer 140 will then initiate the transfer of the purchase amount, less a handling fee, to the pre-established merchant account at the merchant bank 150.

Figure 2:
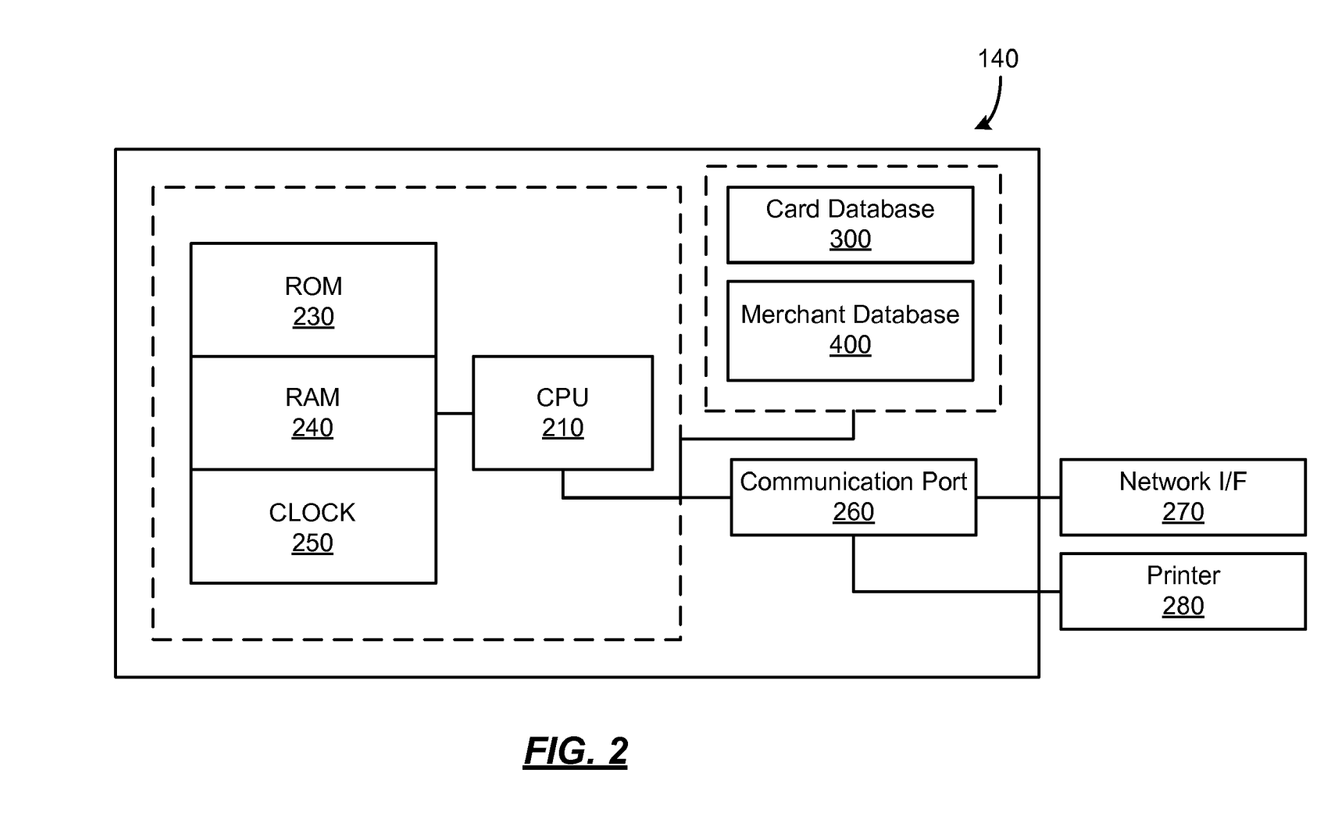
FIG. 2 is a block diagram showing the architecture of an illustrative computing device which may be utilized by the card issuer.

FIG. 2 is a block diagram showing the architecture of an illustrative computing device 200 that may be utilized by the card issuer 140 or other entity in FIG. 1. The computing device 200 may include certain standard hardware components, such as a central processing unit (CPU) 210, a data storage device 220 (e.g., hard drive, flash drive, removable drive), a read only memory (ROM) 230, a random access memory (RAM) 240, a clock 250, and a communications port 260. The CPU 210 is preferably linked to the other elements by means of either a shared data bus or dedicated connections, as shown in FIG. 2.

The CPU 210 may be embodied as a single processor, or a number of processors operating in parallel. The data storage device 220 and/or ROM 230 are operable to store one or more instructions, as discussed below in conjunction with FIGS. 3-7, which the CPU 210 is operable to retrieve, interpret and execute. The CPU 210 preferably includes a control unit, an arithmetic logic unit (ALU), and a CPU local memory storage device, such as, for example, a stackable cache or a plurality of registers, in a known manner. The control unit is operable to retrieve instructions from the data storage device 220 or ROM 230. The ALU is operable to perform a plurality of operations needed to carry out instructions. The CPU local memory storage device is operable to provide high-speed storage used for storing temporary results and control information.

As discussed further below in conjunction with FIGS. 3 and 4, respectively, the data storage device 220 may include a card database 300 and a merchant database 400. The card database 300 may store information regarding each gift card issued by the card issuer 140. The merchant database 400 may store information about merchants, value factors (Vf) and incentives associated with each gift card. Each database and the tables contained therein will be described in further detail below.

The communications port 260 connects the card issuer 140 to a network interface 270, thereby linking the card issuer 140 to the merchant 120, via the credit card processor 130, and to one or more merchant banks 150. In addition, the communications port 260 may optionally connect the card issuer 140 to a printer 280, which may be utilized, among other things, to print gift card balance statements, etc. The communications port 260 preferably includes multiple communication channels for simultaneously connecting the card issuer 140 with multiple parties.

Regarding the illustrative processor 200, numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 3:
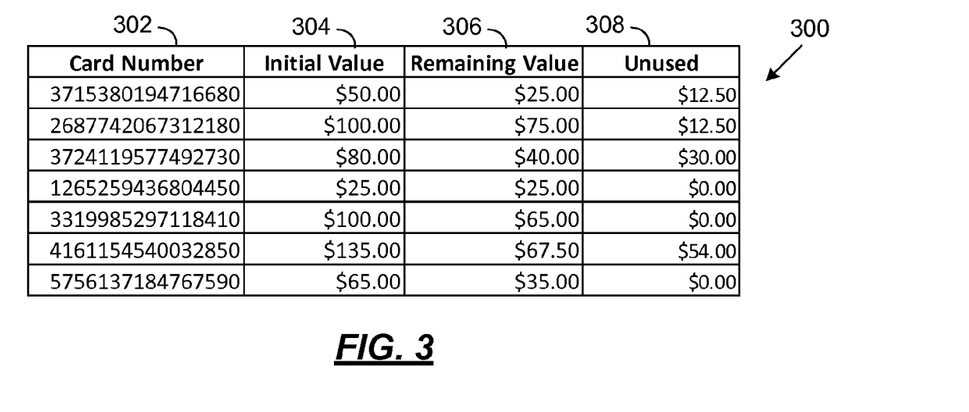
FIG. 3 illustrates an example card database that may include one or more tables containing a card number entry, an initial value, a remaining value, and an unused value.

FIG. 3 illustrates an example card database 300, which may store information regarding each gift card issued by the card issuer 140. In particular, the card database 300 may include one or more tables containing a card number entry 302, an initial value 304, a remaining value 306, and an unused value 308. The initial value 304 represents, for example, the face value or purchase price associated with a particular gift card identified by the card number 302 (as used herein, "card number" may be synonymous with "gift card"). The remaining value 306 is a remaining value associated with each card number 302 as a result of purchases made by a bearer of the gift card identified by the card number 302. The unused value 308 may be an amount that will be returned to the purchaser of the gift card, donated to charity, etc. when the remaining value is zero in accordance with a predetermined disposition rule. The determination of each of the remaining value 306 and unused value 308 within the card database 300 will be described below in greater detail with reference to FIG. 7.

Figure 4:
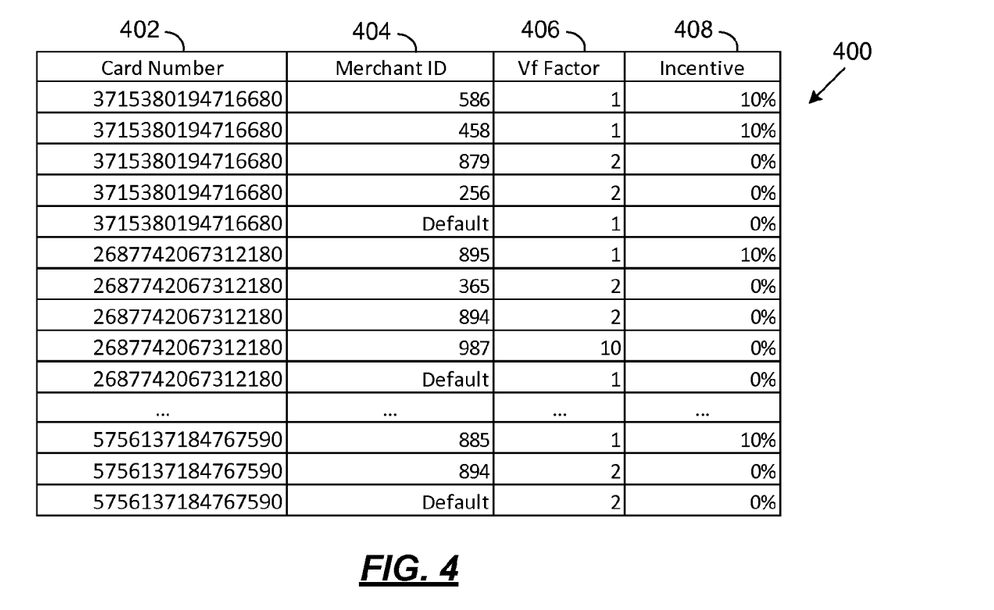
FIG. 4 illustrates an example merchant database containing information about card numbers, merchant IDs, value factors (Vf), and incentives.

FIG. 4 illustrates an example merchant database 400 that may store information regarding card numbers 402, merchant IDs 404, value factors (Vf) 406, and incentives 408. Each card number 402 may have a value that is dynamically determined based on the value factor (Vf) assigned to a particular merchant where the gift card is used, the goods and/or services purchased, a time when the goods and/or services are purchased, or other predetermined parameter associated with a transaction.

For example, when purchases are made using card number 3715380194716680 at merchant ID 586 or 458, the card will have its full remaining value available because the associated Vf for these merchants is 1. However, when this card is used at the merchants identified by merchant ID 879 or 256, it will have an available value that is only half of its remaining value because the value factor ($V_F$) 406 associated with merchant IDs 879 and 256 is 2. As such, for purchases made at merchant IDs 879 and 256, the card will have an associated unused value for that transaction that will be stored in the card table 300.

The incentive 408 may represent a "bonus amount" associated with purchases at the merchant identify by the merchant ID 404. For example, with respect to merchant 586, purchases made their using card number 3715380194716680 may receive a 10% bonus amount. Therefore, if a bearer presents card number 3715380194716680 (having a remaining value of $25); the bearer may be able to use the card for purchases up to $27.50 because there is a 10% incentive associated with merchant 586 for that card.

In some implementations, the incentive amount may change over time. For example, the incentive amount may increase over time to encourage the recipient to carefully consider purchases. In contrast, the incentive amount my decrease over time to encourage quick use of the gift card at particular merchant or for purchases of particular products.

As shown in FIG. 4, different merchant IDs 404 may be associated with one or more card numbers 402. For merchant IDs 404 not specifically associated with a card number 402, a default value may be utilized having a default value factor 406 and/or incentive amount 408.

In some implementations, the merchant database 400 may not include card numbers 402. For example, it may be that all cards issued by the card issuer 140 that are used at merchants identified by the merchant IDs 404 would be afforded the same value factor 406 and incentive amount 408 for each identified merchant. In such cases, a single default value would apply for merchants not specifically identified by the merchant IDs 404.

Figure 5:
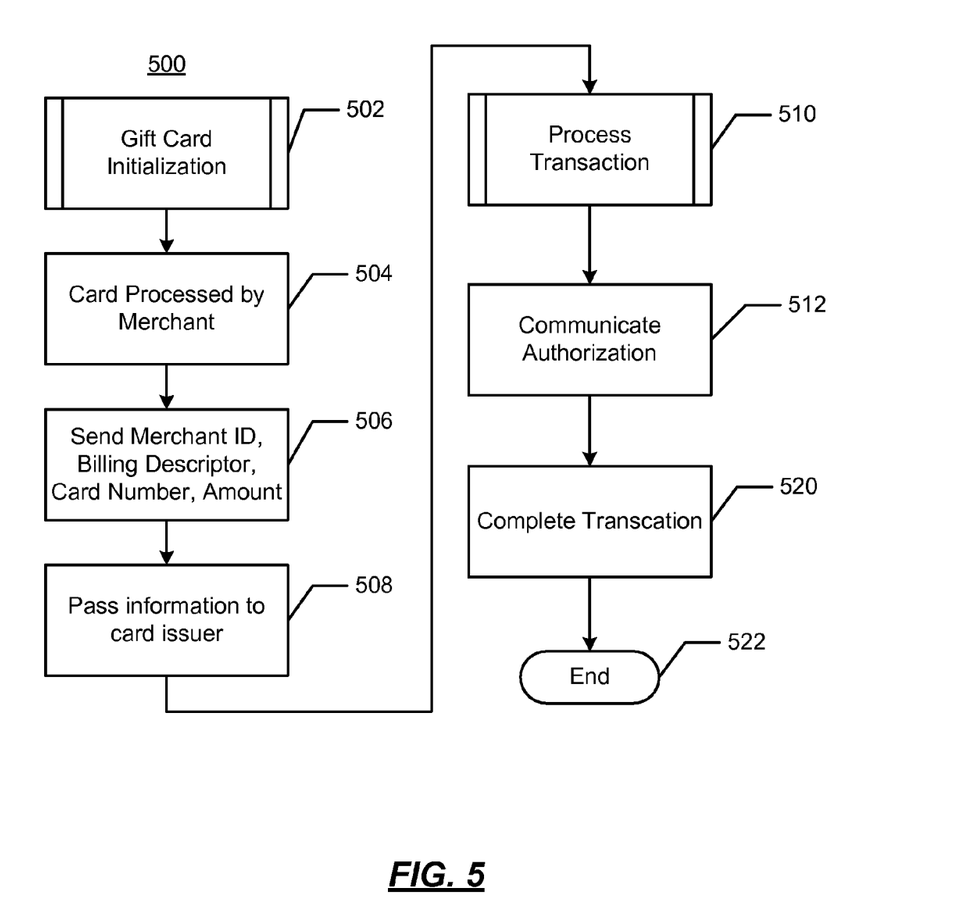
FIG. 5 illustrates an exemplary operational flow for dynamically assigning a value to a gift card and making purchases using the gift card.

FIG. 5 illustrates an exemplary operational flow 500 for dynamically assigning a value to the a gift card and authorizing purchases using the gift card. At 502, a gift card initialization process is performed. The gift card initialization process is further detailed in FIG. 6, which shows an exemplary operational flow 604 initializing the gift card. At 602, a value is set for the gift card. This may be an amount associated with the purchase price of the gift card (e.g., $50), or may be set in accordance with a program offered by a particular merchant, manufacturer, etc. (e.g., a receive a $50 gift card for a purchase). The gift card may be purchased at a physical location (e.g., grocery store, drug store, or other retailer), or online from the card issuer 140 or other source.

Figure 6:
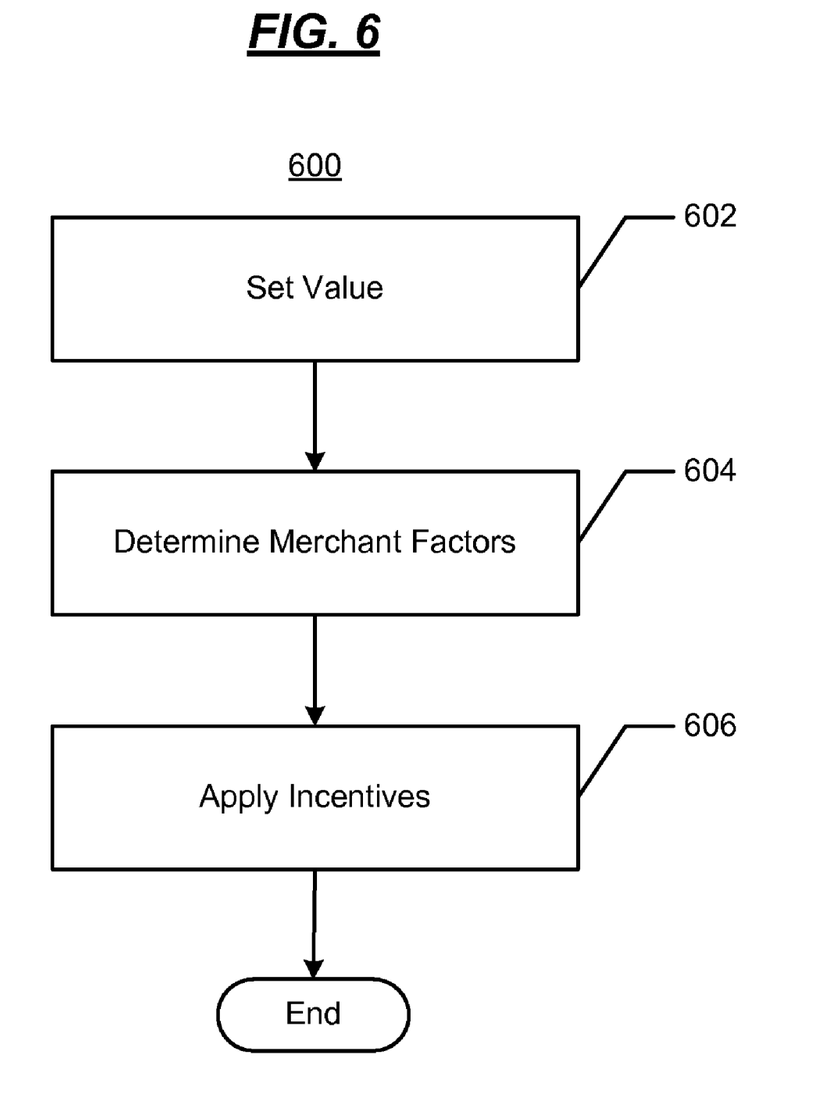
FIG. 6 illustrates an exemplary operational flow for initializing a gift card.

At 604, merchant factors may be determined. These may include defining one or more merchants and their respective value factors to be placed in the merchant database 400 and associated with the card for which the value was set at 602. The merchant factors may be predetermined by the card issuer 140 based on specific merchants, merchant classifications/categories, product offerings, etc. In some implementations, the merchant factors may be based on the point of purchase of the gift card (e.g., the gift card was purchased at a supermarket, therefore all supermarkets have a favorable (i.e., lower) merchant factors). In some implementations, the purchaser may log onto a web site to set the merchant factors for the gift card to set personal preferences.

At 606, incentives may be applied. These may include defining incentive amounts in the merchant table 400 for one or more merchants. The incentive amounts may be determined by the card issuer 140, a manufacturer, a merchant, etc. The process 600 ends and the operational flow continues at 504 in FIG. 5.

After the card initialization process has been performed, the gift card may be used by a recipient/bearer for purchases. For example, the gift card bearer may present the gift card to the merchant for processing as part of a transaction for goods and/or services at 504. The customer 110 may present the gift card to the merchant 120, who in turn swipes the gift card using a magnetic card reader, a smart card reader, or using near-field techniques in order to obtain information about the card for electronic processing. Alternatively or optionally, the merchant 120 may enter the gift card number at a terminal device.

At 506, one or more of a merchant ID, billing descriptor, gift card number, and a purchase amount may be communicated to the card processor. The merchant ID (MID) may be an alphanumeric indicator of a particular merchant. Optionally or additionally, a terminal ID (TID) may be sent to the card processor 130. The billing descriptor may an indication of the goods and/or services being purchased. For example, it may be a UPC number, a SKU number, or some other unique identifier of the products and/or goods being purchased. The card number may be the card number associated with the gift card being used by the customer 110. The purchase amount is the purchase price of the goods and/or services being purchased by the customer 110 from the merchant 120.

At 508, the merchant ID, the billing descriptor, the card number, and/or the purchase amount may be communicated to the card issuer. This information is passed to the card issuer 140 by the card processor 130 for processing at 510. In some implementations, the card processor 130 and card issuer 140 may be the same entity. The transaction may be processed at 510 in accordance with the operational flow 700 shown in FIG. 7.

Figure 7:
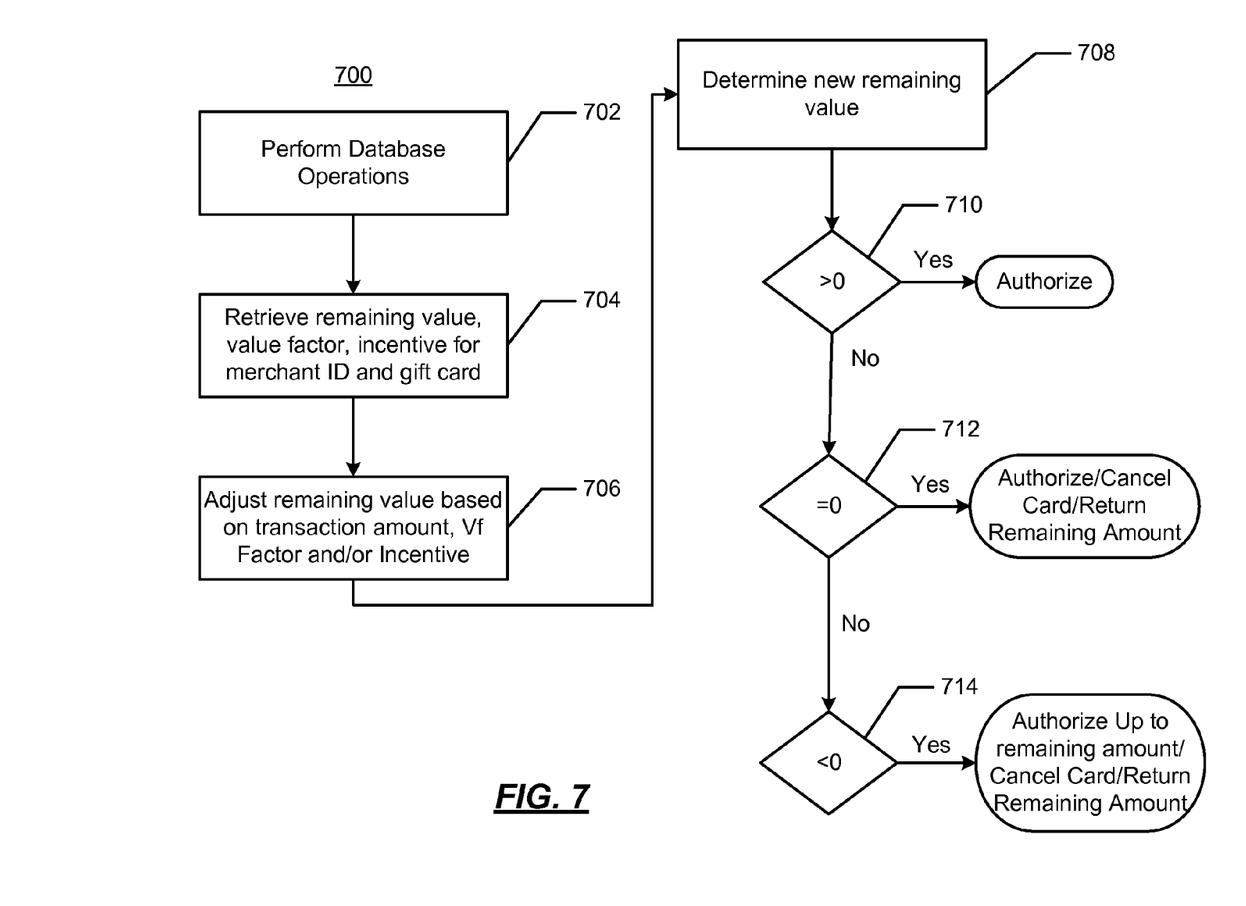
FIG. 7 illustrates an exemplary operation flow for processing and authorizing a gift card purchased.

Referencing FIG. 7, at 702, database operations are performed. For example, the CPU 210 may access the card database 300 and/or the merchant database 400 to retrieve the remaining value of the gift card at 704, as well as other information relevant to the transaction from the tables 300 and 400.

At 706, using information regarding the merchant, the value factor, and incentives associated with the merchant for the gift card may be retrieved, the remaining value associated with the gift card may be adjusted to determine a new remaining value at 708. In some implementations, the following expression may be used to determine the new remaining value of the card in view of the above identified parameters after a transaction:

$$R_V = \left(R_v\left(1 + \frac{1}{I_V}\right) - TV_f\right)$$

where:
$R_v$=the remaining value of the card
T=the transaction amount
$V_f$=the value factor; and
$I_v$=the incentive amount.

The unused amount associated with a transaction may be determined as follows:

$$U=U+(TV_F-T)$$

where:
U=the unused amount
T=the transaction amount; and
$V_f$=the value factor.

At 710, is determined if the remaining value is greater than zero. If so, then the card issuer may authorize the transaction.

If it is determined that the card value is not greater than zero, then it is determined at 712, if the card value is equal to zero. If so, then the transaction is authorized, the card may be canceled, and any unused amount that is returned to the purchaser. If the card value is not equal to zero, then at 714, it is determined that the card value is less than zero. The transaction may be authorized up to the remaining balance on the card, where after the card is canceled and any unused amount that is returned to the purchaser. It is noted that the unused amount may be disposed of in any way in accordance with disposition instructions. For example, in addition to being returned to the purchaser, it may be donated to charity, deposited in a bank account, used to offset other financial obligations (e.g., loans), etc.

Returning again to FIG. 5, at 512, the authorization from the process 700 is communicate to the merchant. The authorization may be communicated from the card issuer 140 to the card processor 130 and then to the merchant 120, as shown in FIG. 1.

At 520, the transaction is completed. The customer 110 may then take possession of the goods/services. The process ends at 522.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-readable medium comprising computer-readable instructions for dynamically assigning a value to a gift card, comprising:
   initializing the gift card by associating a value factor to transactions made using the gift card;
   receiving transaction information regarding a purchase being made with the gift card;
   retrieving the value factor associated with purchase in accordance with the transaction information; and
   adjusting a remaining value of the gift card in accordance with the transaction information and the value factor, and determining a new remaining value of the gift card for the transaction by dividing the remaining value by the value factor and authorizing a transaction associated with the transaction information.

2. The computer-readable medium of claim 1, further comprising instructions for determining the value factor selected from one of a merchant, merchant class, product or product manufacturer.

3. The computer-readable medium of claim 1, further comprising instructions for associating an incentive amount to the transactions made using the gift card.

4. The computer-readable medium of claim 3, wherein the incentive amount is selected from a merchant, a merchant class, a product, or a product class.

5. The computer-readable medium of claim 3, further comprising instructions for adjusting the remaining value of the gift card in accordance with the incentive amount.

6. The computer-readable medium of claim 1, adjusting the remaining value further comprising instructions for updating an unused amount associated with the gift card.

7. The computer-readable medium of claim 6, wherein the unused amount is determined selected from the value factor associated with the purchase.

8. A computer-readable medium comprising computer-readable instructions for administering a dynamic gift card valuation, comprising:
   receiving transaction information from a merchant including a merchant identifier, a gift card number, a billing descriptor, and a transaction amount;
   determining a remaining value of a gift card identified by the gift card number;
   applying a value factor to the remaining value in accordance with the transaction information; and
   adjusting the remaining value of the gift card in accordance with the value factor; and
   determining a new remaining value of the gift card for the transaction by dividing the remaining value by the value factor and authorizing a transaction associated with the transaction information.

9. The computer-readable medium of claim 8, further comprising instructions for determining the value factor selected from one of the merchant identifier or the billing descriptor.

10. The computer-readable medium of claim 8, further comprising instructions for determining an unused amount associated with transactions made with the gift card.

11. The computer-readable medium of claim 10, wherein the unused amount is determined in accordance with the value factor applied to the remaining value.

12. The computer-readable medium of claim 10, wherein when the remaining amount is reduced to zero, the unused amount is disposed of in a predetermined manner.

13. The computer-readable medium of claim 8, further comprising instructions for applying an incentive amount to the transaction.

14. The computer-readable medium of claim 13, wherein the incentive amount increases the remaining value.

15. A computer-readable medium comprising computer-readable instructions for processing a gift card having a dynamic value, comprising:
   receiving transaction information from a merchant, the transaction information including a gift card number;
   retrieving a remaining value associated with the gift card number;
   retrieving a value factor in accordance with the transaction information;
   retrieving an unused amount associated with the gift card number;
   determining a new remaining value and a new unused amount selected from the transaction information and the value factor;
      wherein the new remaining value is determined by dividing the remaining value by the value factor; and
   authorizing a transaction associated with the transaction information.

16. The computer-readable medium of claim 15, further comprising instructions for determining the value factor selected from a merchant identifier within the transaction information.

17. The computer-readable medium of claim 15, further comprising instructions for determining the unused amount in accordance with a difference between the remaining value and the new remaining value.

18. The computer-readable medium of claim 17, wherein the unused amount is processed in accordance with a predetermined disposition when the gift card has no remaining value.

19. The computer-readable medium of claim 15, further comprising instructions for applying an incentive amount selected from the transaction information.

20. The computer-readable medium of claim 19, wherein the incentive amount increases the remaining value for a particular transaction identified by the transaction information.

* * * * *